US011310173B2

(12) United States Patent
Vaughn et al.

(10) Patent No.: US 11,310,173 B2
(45) Date of Patent: Apr. 19, 2022

(54) VIRTUAL AGENT CHAT MODEL UPDATES

(71) Applicant: Kyndryl, Inc., New York, NY (US)

(72) Inventors: Garfield W. Vaughn, South Windsor, CT (US); Vasanthi M. Gopal, Plainsboro, NJ (US); Gandhi Sivakumar, Bentleigh (AU); Lakisha R. S. Hall, Upper Marlboro, MD (US)

(73) Assignee: KYNDRYL, INC., New York, NY (US)

(*) Notice: Subject to any disclaimer, the term of this patent is extended or adjusted under 35 U.S.C. 154(b) by 0 days.

(21) Appl. No.: 16/427,623

(22) Filed: May 31, 2019

(65) Prior Publication Data

US 2020/0382450 A1 Dec. 3, 2020

(51) Int. Cl.
*H04L 51/02* (2022.01)
*H04L 51/04* (2022.01)
*G06N 20/00* (2019.01)
*H04L 12/18* (2006.01)
*G06F 11/34* (2006.01)

(52) U.S. Cl.
CPC .......... *H04L 51/02* (2013.01); *G06F 11/3476* (2013.01); *G06N 20/00* (2019.01); *H04L 12/1827* (2013.01); *H04L 51/04* (2013.01)

(58) Field of Classification Search
CPC ..... H04L 51/02; H04L 51/04; H04L 12/1827; G06N 20/00; G06F 11/3476
USPC .................................................. 709/206, 217
See application file for complete search history.

(56) References Cited

U.S. PATENT DOCUMENTS

| | | | |
|---|---|---|---|
| 8,767,948 B1* | 7/2014 | Riahi | H04M 3/4936 379/266.08 |
| 8,892,419 B2 | 11/2014 | Lundberg et al. | |
| 8,929,856 B1* | 1/2015 | Kamboh | H04L 45/3065 455/404.2 |
| 2011/0078105 A1* | 3/2011 | Wallace | G06Q 30/02 706/47 |
| 2011/0252108 A1* | 10/2011 | Morris | H04L 51/32 709/206 |
| 2013/0268260 A1* | 10/2013 | Lundberg | G06F 16/90332 704/8 |
| 2015/0201075 A1* | 7/2015 | Fan | H04M 3/5232 379/88.01 |
| 2016/0182410 A1* | 6/2016 | Janakiraman | G06F 40/30 709/206 |

(Continued)

OTHER PUBLICATIONS

Abdul-Kader, Sameera A., and J. C. Woods. "Survey on chatbot design techniques in speech conversation systems." International Journal of Advanced Computer Science and Applications 6, No. 7 (2015). (Year: 2015).*

(Continued)

*Primary Examiner* — Suraj M Joshi
*Assistant Examiner* — Melaku Y Habtemariam
(74) *Attorney, Agent, or Firm* — Steven L. Nichols; Fabian VanCott

(57) ABSTRACT

According to a computer-implemented method, a chat data set is received, which chat data set includes information indicative of a plurality of natural language chat transcripts of chats that occurred between a virtual agent and a human. Machine logic analyzes the chat data set to identify an error that occurred in the operation of the virtual agent. The machine logic updates a chat model based on the chat data set.

20 Claims, 7 Drawing Sheets

(56) References Cited

U.S. PATENT DOCUMENTS

| | | | |
|---|---|---|---|
| 2017/0111509 A1* | 4/2017 | McGann | H04M 3/5233 |
| 2017/0324866 A1* | 11/2017 | Segre | H04L 51/046 |
| 2018/0054464 A1* | 2/2018 | Zhang | H04L 51/04 |
| 2018/0054523 A1* | 2/2018 | Zhang | G06N 5/04 |
| 2018/0218374 A1* | 8/2018 | Shah | G06Q 30/016 |
| 2019/0042988 A1* | 2/2019 | Brown | G06F 16/9535 |

OTHER PUBLICATIONS

Jiang, Ridong & Banchs, Rafael & Kim, Seokhwan & D'Haro, Luis & Niculescu, Andreea & Yeo, Kheng Hui. (2015). Configuration of dialogue agent with multiple knowledge sources. 840-849. 10.1109/APSIPA.2015.7415390. (Year: 2015).*

List of IBM Patents or Patent Applications Treated as Related; May 31, 2019; pp. 1-2.

* cited by examiner

VIRTUAL AGENT CHAT MODEL UPDATES

BACKGROUND

The present invention relates to virtual agent management, and more specifically to the correction of virtual agent operation by updating chat models for the virtual agent.

Virtual agents are known. As stated in the Wikipedia entry for "software agent," a virtual agent is: "[A] computer program that acts for a user or other program in a relationship of agency, which derives from the Latin agere (to do): an agreement to act on one's behalf. Such "action on behalf of" implies the authority to decide which, if any, action is appropriate. Agents are colloquially known as bots, from robot. They may be embodied, as when execution is paired with a robot body, or as software such as a chatbot executing on a phone . . . or other computing device. Software agents may be autonomous or work together with other agents or people. Software agents interacting with people (e.g. chatbots, human-robot interaction environments) may possess human-like qualities such as natural language understanding and speech, personality or embody humanoid form . . . [Types of virtual agents] include intelligent agents (in particular exhibiting some aspects of artificial intelligence, such as reasoning), autonomous agents (capable of modifying the methods of achieving their objectives), distributed agents (being executed on physically distinct computers), multi-agent systems (distributed agents that work together to achieve an objective that could not be accomplished by a single agent acting alone), and mobile agents (agents that can relocate their execution onto different processors)."

Logs for operating virtual agents are known. These logs are sets of data that describe any aspect(s) of operating the virtual agent. The types of data typically stored in these virtual agent logs include the following types of data: (i) actual content of the conversation; (ii) time and date when the virtual agent instantiation began operating; (iii) operating system, or kernel, upon which the virtual agent is operating; (iv) virtualized computing environment (for example, virtual machine, container) in which the agent is operating; (v) times and dates of switching the virtual agent instantiation between various modes of operation (for example, idle mode and active mode); (vi) lines of code of the software of the virtual agent that are executed and times at which they are executed; (vii) content and times of requests for help (for example, queries) input to the virtual agent by users; (viii) content and times of responses to requests for help output by the virtual agent to users; content and times of requests for information output by to the virtual agent to data sources (for example, a request for information about a person that is stored in an online database); (x) content and times of responses to requests for information input by to the virtual aunt by data sources; and (xi) information about abnormal operational events (for example, computer crashes).

SUMMARY

According to an embodiment of the present invention, a computer-implemented method is described. According to the computer-implemented method, a chat data set is received, which chat data set includes information indicative of a plurality of natural language chat transcripts of chats that occurred between a virtual agent and a human. Machine logic analyzes the chat data set to identify an error that occurred during operation of the virtual agent. The machine logic also updates a chat model based on the chat data set.

The present specification also describes a system. The system includes a log capture device to receive a chat data set including information indicative of a plurality of natural language chat transcripts of chats that occurred between a virtual agent and a human. A log analysis device of the system analyzes the chat data set to identify an error that occurred during operation of the virtual agent. A chat model update device of the system updates a chat model based on the chat data set.

The present specification also describes a computer program product for managing a virtual agent. The computer program product includes a computer readable storage medium having program instructions embodied therewith. The program instructions are executable by a processor, to cause the processor to 1) receive, by the processor, a chat data set including information indicative of a plurality of natural language chat transcripts of chats that occurred between a virtual agent and a human, 2) analyze, by the processor, the chat data set to identify an error that occurred during operation of the virtual agent, and 3) update, by the processor, a chat model based on the chat data set.

BRIEF DESCRIPTION THE DRAWINGS

DETAILED DESCRIPTION

Figure 1:
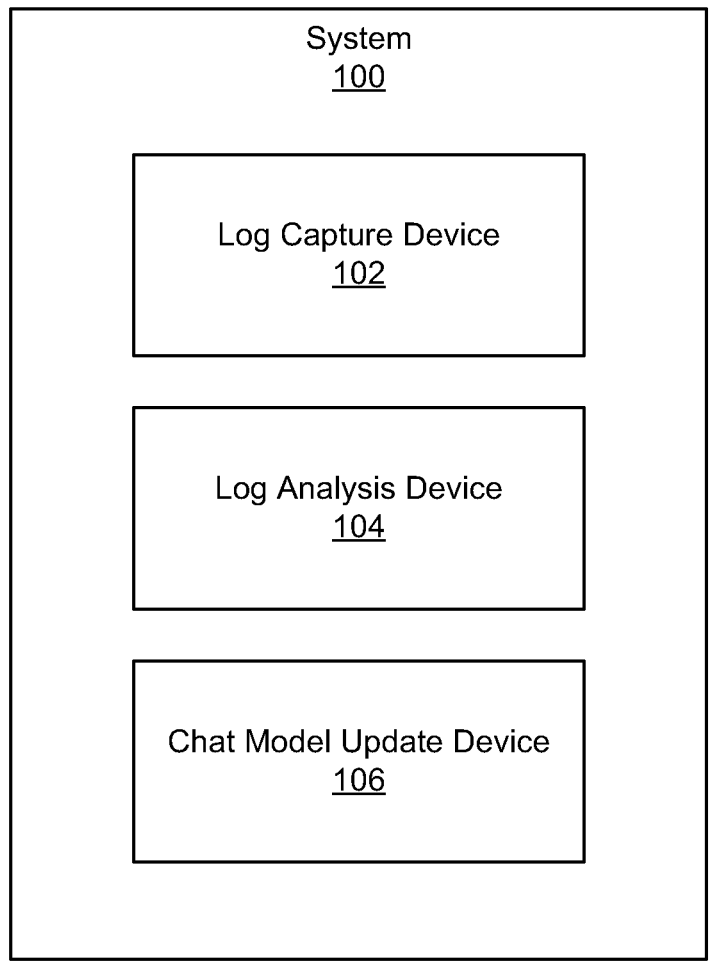
FIG. 1 depicts a system for updating virtual agent chat models, according to an example of principles described herein.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the uses computer and partly on a remote computer or entirely on the remote computer or server. In the latter scenario, the remote computer may be connected to the uses computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The industry trend is emerging towards "cognitive models" enabled via big data platforms. Such models, which may be termed as cognitive entities, are aimed to remember the past, interact with humans, continuously learn, and refine the responses used in the future. One of the emerging capabilities in the cognitive space is virtual agents. Virtual agents have been deployed in the field for performing various tasks and there is a need to monitor their performance, not only to demonstrate their capability as it becomes a commodity, but also to tune their performance. Virtual agents may be deployed through federated or other patterns.

While virtual agents are known, heir use in many applications may be enhanced. As described above, virtual agents may attempt to replicate a human agent. For example, a user needing technical support may enter a chat for a business, and a virtual agent may be relied on to provide the needed assistance. However, the environment in which the virtual agent operates changes over time such that the operation of the virtual agent should be updated. In general, to change the operation of a virtual agent, a manual update to the virtual agent is performed. That is, an administrator may be required to manually update the logic/flow by which the virtual agent operates. As a specific example, if a flow by which the virtual agent operates incorrectly routes a conversation to a node of the virtual agent, an administrator may have to go in, and generate a response that the virtual agent would use when a subsequent instance of that correspondence is received.

That is, the current form of virtual agent training relies on interviewing the call center agents or other end user interfaces to define the chat model. This suffers from the following disadvantages, 1) manually programming the both the base flow and variations to the flow over time, 2) inaccuracies in the chat flow as compared to automatic discovery mechanisms, 3) absence of metadata of the roles/expertise to handle the customer queries, which metadata would enable the definition of role-specific virtual agent design, and 4) inability to facilitate automatic flow collection during handover to humans, identifying corrections and variations for the given user input.

Accordingly, the present system, method, and computer program product address the above deficiencies and others. Specifically, the present specification describes a solution that include a system which may initially work offline and analyze the call center interaction logs (i.e., logs extracted from speech to text or mere text logs and defines a chat flow logic). The system subsequently coordinates with virtual agent and human agent interaction logs to identify variations and build the chat flows based on the variation. Such an apparatus may be termed a Log-based virtual agent flow engineer (LBAFE) which analyzes the call center interaction logs and defines virtual agent chat flows.

Accordingly, the present systems, methods, and computer program products describe the monitoring and management of cognitive models, and of virtual agents in particular. Specifically, the present specification describes a system that tracks virtual agent interactions with a human, determines errors in those interactions, and then automatically updates a chat model based on the analysis such that future virtual agent interactions are more capable of handling chats.

Such a system, method, and computer program product enable the reverse creation of chat models from logs. Such a mechanism has not previously been available. That is, current technologies use the manual definition of a chat flow, which chat flows are static and are updated through various other less effective mechanisms and is not reverse engineered based on existing call center interaction, i.e., log-based analysis, Put yet another way, cognitive capabilities do not have logs-based monitoring as proposed in the current specification.

As described in the present specification and in the appended claims, the term "chat flow" or similar language refers to the nodes in a virtual agent that each relate to different chat conversation contexts. That is, each node may provide virtual agent services related to a particular topic. For example, a first node of a virtual agent relating to technical support for a home entertainment system may provide technical support regarding a receiver of a home entertainment system while a second node of a virtual agent may provide technical support regarding wiring of a home entertainment system.

Further, as used in the present specification and in the appended claims, the term "chat model" or similar language refers to the rules that govern the chat flow. That is, the chat model refers to the rules that determine what conversations are directed to what nodes. For example, a chat model may include a topic manager that determines a topic, based on semantic analysis, to determine what the context is. Based on an identified context, the chat model may indicate to which node in the chat flow, the human should interact with in order to receive the assistance they requested.

As used in the present specification and in the appended claims, the term "a number of" or similar language is meant to be understood broadly as any positive number including 1 to infinity.

Turning now to the figures, FIG. 1 depicts a system (100) for updating virtual agent chat models, according to an example of principles described herein. To achieve its desired functionality, the system (100) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components.

The system (100) includes a log capture device (102) to receive a chat data set, which chat data set includes information indicative of a plurality of natural language chat transcripts of chats that occurred between a virtual agent and a human. As a specific example, the virtual agent may be implemented as a voiced system that a human user may interact with over the phone. In this example, the log capture device (102) may include a speech-to-text converter to translate the audio communication into a text communication and then to store the text communication. In another example, the virtual agent may be implemented as a chatbot that interacts through textual real-time communication with a human or system user. In this example, the log capture device (102) stores the text communication.

The chat data set may include the correspondence between a virtual agent and either a human user or a system user. The chat data set includes this information as well as metadata that is associated with the chat, which metadata may include information such as timestamps on requests by a human user and responses by the virtual agent as well as code executed by the virtual agent in generating the responses. As will be described below, the system (100) may also capture chat transcripts between a human agent and a human, by which the system (100) may further refine the chat model.

The system (100) also includes a log analysis device (104). The log analysis device (104) may analyze the chat data set to identify an error that occurred during operation of the virtual agent. An identified error may be indicative of an error in the chat model and/or chat flow. That is, over the course of a conversation between a virtual agent and a human, a conversation may be passed to different nodes of the virtual agent, each node having a particular subject matter expertise. An error, such as incorrect information be provided back to a human, may indicate that the conversation was improperly routed to a particular node.

In some examples, the analysis may be based on received user feedback. That is, a user interacting with the virtual agent may manually indicate dissatisfaction. As a specific example, the user input may indicate that the virtual agent conversation changed subject indicating that the virtual agent incorrectly handed a conversation to a different node in the chat flow. In this case, an error is identified by the presence of a tag, flag, or other metadata indicating user dissatisfaction with the operation of the virtual agent and why the operation of the virtual agent was unsatisfactory.

In yet another example, the log analysis device (104) includes a natural language processor. In general, natural language processing refers to the operation of a device to understand and process human languages. That is, computing devices may by designed to understand coding languages. However, human languages are much more unstructured, and thereby difficult to understand. Accordingly, a natural language processor reads, understands, and internalizes human languages. A natural language processor accepts as input unstructured text, such as the correspondence between a human user and a virtual agent, and puts it into a form understandable by a computing device, such that the computing device can execute operations based on the language. For example, the natural language processor of the log analysis device (104) may determine a context/content of a conversation.

Such a natural language processor may implement a variety of techniques including syntactic analysis to determine how the correspondence aligns with grammatical rules. Natural language processing may also include semantic analysis to understand a meaning of text. While particular reference to natural language processing has been made, other methods of natural language processing may be implemented in accordance with the principles described herein. Suffice it to say that by using natural language processing of both the input by a human user and the responses by a virtual agent, the system (100) may determine whether there is an error in the chat flow/chat model that govern operation of the virtual agent.

As a simple example, a user may input the text, "could you please let me know the weather in Akron, Ohio." Responsive to this, the virtual agent may respond with the phrase, "traffic is congested on highway 15." A natural language processor may identify keywords in the user's statement of "weather" and "Akron, Ohio." The natural language processor may also identify keywords in the response of "traffic" and "highway 15." Accordingly, via natural language processing, the system (100) may determine a content, context, meaning, or intent of the user request to be related to weather in Ohio. Given that the response is unrelated, i.e., the content/context of the response relates to traffic along a highway, the system (100) may determine that the conversation was handed to the incorrect node. That is, rather than the conversation being managed by a weather-specific node, it was handled by a traffic-specific node. Thus, it is determined that the flow, for whatever reason, incorrectly routes the conversation to a traffic-specific node as opposed to a weather-specific node.

In another example, the log analysis device (104) determines which nodes of the chat flow are operating and when they are triggered. For example, as described above, a virtual agent includes multiple nodes. In some examples, the different nodes may have different subject matter expertise. Different conversational contexts may implement natural language processing that is based on different norms. For example, certain unstructured phrases may be more used in one context than another. Accordingly, by providing nodes that can handle different specific aspects of a communication, greater functionality is provided by the virtual agent by implementing nodes that are particularly trained for a particular context.

Over the course of an interaction with a human, the conversation may be handed off to different nodes and the log analysis device (104) records when conversations are handed off to different nodes of the virtual agent. An erroneous handing off of the conversation to a different node may be identified as an error in the chat model/chat flow. Accordingly, the log analysis device (104) identifies when the virtual agent hands a conversation to an incorrect node of the virtual agent and identifies this as an error. As a specific example, a user may be interfacing with a financial services virtual agent and asks "Please provide me with a balance in my checking account." in response, the virtual agent may incorrectly pass the conversation to a node that specializes in home mortgages. Accordingly, the log analysis device (104), in some examples using a natural language processor, may determine that the conversation was not related to home mortgages and that the virtual agent incorrectly triggered the home mortgage node.

In another example, the log analysis device (104) determines when human agents are introduced into a conversation. For example, in some cases it may be more effective to introduce a human agent into the chat as a human agent may have more expertise to handle complex questions. However, it is ineffective to introduce a human aunt into a conversation when it is expected that a virtual agent may handle the conversation. That is, an erroneous, or premature, handing off of the conversation to a human agent may be identified as an error in the chat model/chat flow. Accordingly, the log analysis device (104) identifies when the virtual agent incorrectly hands a conversation to a human agent and identifies this as an error.

As a specific example, a user may be interfacing with a customer support virtual agent for a furniture store and asks the question, "when do you open?" Responsive to this request, the virtual agent may respond, "I don't understand your question, let me connect you with an agent." It may be the case, that a simple request for operating hours of a business should be addressable by the virtual agent, so the log analysis device (104), in some examples using a natural language processor, may determine that the conversation was simple enough the virtual agent should have been able to respond, and thus identify an error of incorrectly triggering a human agent.

In some examples, the log analysis device (104) may associate the errors with a node on which they occurred. In this example, the log analysis device (104) identifies the errors based on a node of the virtual agent where they originate. In this optional example, more effective corrective action may be implemented as an error may be more particularly identified with the node where it occurred.

The system (100) also includes a chat model update device (106) to update a chat model based on the chat data set. That is, based on keyword analysis, handoff data analysis, timestamps, user feedback and other information included in the chat data set, the chat model update device (106) may update the chat model, that is the rules that identify to which node/human agent, the conversation is to be handed.

For example, as described above, the chat model may include rules that incorrectly pass a conversation to a home mortgage node when a question is requesting information on a checking account. Accordingly, the chat model may be updated. For example, the chat model may be updated with new keywords to indicate when a conversation should be passed to the home mortgage node. Accordingly, in this example, rather than passing a question regarding checking accounts to a home mortgage node, the system (100) may determine that criteria for triggering the home mortgage node are not met, and therefore the conversation is not passed to that node.

In another example, the chat model update device (106) may add nodes to a chat flow. That is, as new products are released for a manufacturing company, users may engage virtual agents inquiring about the new product. However, as it is a new product, the virtual agent may not yet have a node associated with the new product. Accordingly, the log analysis device (104) may identify, for example via keyword analysis, that the new product is being referenced and the chat model update device (106) may be aware that there is not a node related to the new product, and thereby may create the node in the chat flow as well as the rules that govern operation of that node in the chat model.

In yet another example, the chat model update device (106) may update a chat model based on variations in human correspondence. That is, as described above, there may be many ways to communicate a particular intent and the chat model update device (106) may update the model to account for these variations. As a specific example, a user may say, "what time do you open?", "what are your hours?", or "are your doors open now?" in an attempt to determine if a particular business is open, in this example, the log analysis device (104), in some cases using a natural language processor, may analyze these variations in human correspondence, and identify that all are requesting the same information. The chat model update device (106) then updates the chat model based on an identified variation. That is, the chat model is updated such that any of the above-mentioned user requests route the conversation to a node of the virtual agent that manages operating hours for the business.

Thus, the present system (100) provides a virtual agent that learns from historical logs of chats as well as metadata associated with those chats to update how the virtual agent operates and how a conversation is routed amongst the various nodes of the virtual agent. Such a dynamic real-time adjustment to the chat model/chat flow leads to a more effective tool to provide information to a user. That is, historically a manually created set of processes is generated for a virtual agent. Such a process is complex, time-intensive and may not be conducive to an effective and adapting virtual agent. Accordingly, the present system (100) learns through the conversation itself, how to route the conversation to different nodes within a virtual agent, and in some cases to different human agents within an organization. This chat model and chat flow can then be used as an assistant to human support personal in the case of providing customer service support and can also be used by the virtual agent itself in determining when to transition a call/chat to a different node of the virtual agent or to a human support agent. That is, from the conversation itself, the virtual agent learns how to manage a conversation and route a conversation to appropriate nodes/human agents who are trained in specific subject matter that is a topic of a conversation.

Figure 2:
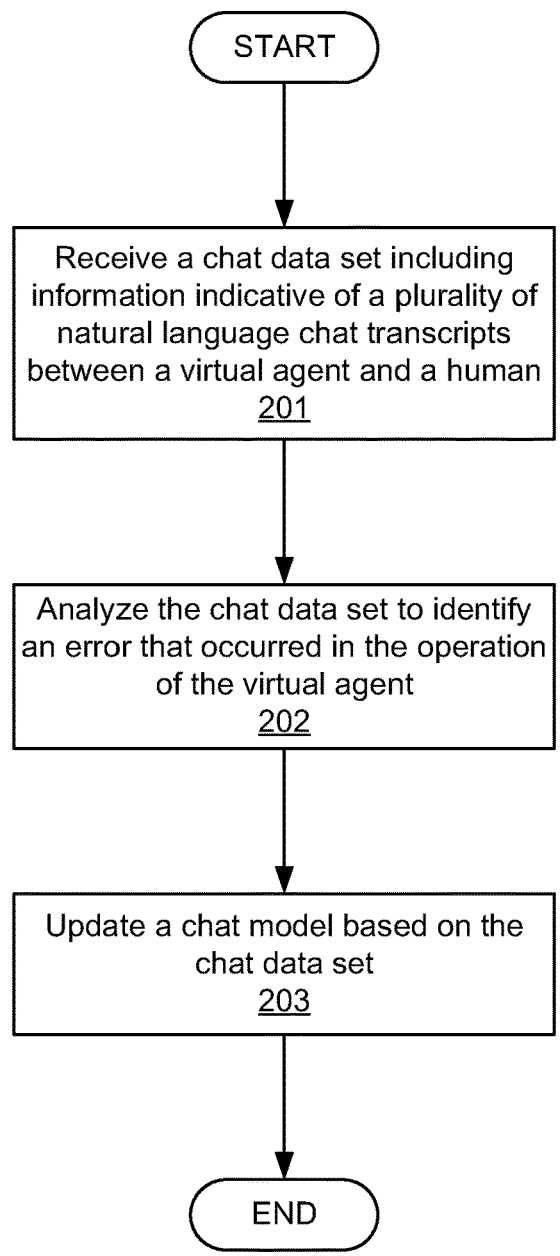
FIG. 2 depicts a flowchart of a method for updating virtual agent chat models, according to an example of the principles described herein.

FIG. 2 depicts a flowchart of a method (200) for updating virtual agent chat models, according to an example of the principles described herein. As described above, a virtual agent is machine logic that interacts with a human or a system, and attempts to replicate human behavior. That is, the virtual agent may interact with humans, specifically learning from past human interactions, and adapts to provide pertinent information and responses. For example, a virtual agent may employ natural language processing to receive incoming correspondence which may be auditory or textual, and to discern a meaning and/or intent of the correspondence.

Logs of the interactions with human users are recorded and may be used by the virtual agents to refine its performance. For example, the virtual agents may be machine-learning virtual agents that, based on training data, can increase their performance. That is, as a machine-learning virtual agent receives and analyzes more and more examples of chat logs, the virtual agent can learn how to route a call through its nodes to more accurately provide relevant information to a human user. The present method (200) describes such a log-based update to virtual agent chat models.

Specifically, the method (200) includes receiving (block 201) a chat data set that includes information indicative of a plurality of natural language chat transcripts of chats that occurred between a virtual agent and a human. As described above, such chat data sets include a variety of information from which virtual agent performance can be adjusted. In general, a chat log refers to the correspondence between a virtual agent and a human or a virtual agent and a system. In addition to receiving (block 201) the chat log, the log capture device (FIG. 1, 102) may receive other data along with the log. This additional data as well as the log itself may be referred to as the chat data set. The chat data set may also include information relating to handoffs of a conversation between nodes of the virtual agent as well as handoffs to a human agent.

In some examples, the information includes user feedback. For example, throughout the course of the interaction, a user may be dissatisfied with the response of the virtual agent. Accordingly, the user may transmit, via an icon selection or another mechanism, an indication that the virtual agent is not performing satisfactorily. For example, when a user asks, "what is the battery life on a model 300 laptop," a virtual agent may respond, "below are the physical dimensions of the battery of the model 300 laptop." As the virtual agent output was not responsive to the question, a user may indicate, for example via a thumbs down icon, that the response was not helpful. This user feedback may be provided as part of the received (block 201) chat data set. This feedback may be indicative that the conversation was improperly routed within the virtual agent. For example, the conversation was routed to a physical dimensions-based node when it should have been routed to a power-based node.

The method (200) also includes analyzing (block 202), by machine logic and specifically the log analysis device (FIG. 1, 104), the chat data set to identify an error in the chat model/chat flow. As described such errors may be of a variety of types and may include the incorrect routing of a call within the virtual agent, or an incorrect routing of the call out of the virtual agent, for example to a human agent.

The log analysis device (FIG. 1, 104) may identify an error based on a routing of the conversation. That is, a conversation is routed between nodes of a virtual agent and/or to a human agent. This routing is governed by a chat model, or rules that indicate to which node/human agent a conversation should be assigned to. That is, different nodes may have specific natural language processors/machine-learning mechanisms to handle particular types of conversation. For example, a checking account virtual agent node may have certain semantic/syntactic analysis tools to interpret requests for account balances, transfers, etc. and a home mortgage virtual agent node may have different semantic/syntactic analysis tools to interpret additional payments or questions regarding escrow and/or interest payments. Such a division of the virtual agent into nodes increases the efficacy and understanding of the unstructured and complex human language. That is, were one node required to analyze all forms of communication and respond accordingly may rely on an enormous training set, may not be particularly accurate in its interpretation, and could result in a large lag in response time. Accordingly, by compartmentalizing the topics, a virtual agent may be more effective and use less bandwidth to interpret and internalize particular human correspondence.

However, with such compartmentalization, or subject matter specialization, a possibility exists of incorrect routing of a conversation, which incorrect routing may lead to user dissatisfaction and incorrect information provided to a user. Accordingly, an identified error may be an incorrect routing or handing off of a conversation to a node and/or a human agent. Accordingly, the log analysis device (FIG. 1, 104), identifies which nodes are triggered, when they are triggered, and the conditions that led to the triggering, to identify whether or not certain nodes were properly triggered. If not, then the log analysis device (FIG. 1, 104) may flag this event as an error in the chat flow/chat model.

The chat model update device (FIG. 1, 106) then updates (block 203) a chat model based on the chat data set. In some examples, updating the chat model includes creating a new chat model. That is, the method (200) may be implemented to initialize a virtual agent and the natural language processor may, using a training data set and actual real-time conversations, generate the nodes of a chat flow as well as the rules that govern direction of the conversation amongst the nodes.

In another example, updating (block 203) the chat model includes updating an existing chat model. For example, the environment in which the virtual agent operates may change. That is, new products may be added, different topics of conversation may develop over time, etc. By updating (block 203) an existing chat model, the virtual agent is dynamic and can be automatically adjusted to account for such environmental changes without relying on manual updates to the chat model. Updating the existing chat model may include updating rules of the chat model, which rules indicate to which nodes of a virtual agent the conversation is handed off.

Accordingly, the present method (200) enhances virtual agent performance. That is, in general, to implement updates, a virtual agent is updated manually and the chat flow and chat model become static and just change when there is a re-work that is done manually. As new services and/or products are developed, the way a chat flow and chat model are modified will be manually, which may be complex and time-intensive. By comparison, the present method (200) describes real-time updates based on actual occurring conversations. Any changes to the chat flow and chat model are identified by the system (FIG. 1, 100) which can augment/modify the chat model and chat flow.

Figure 3:
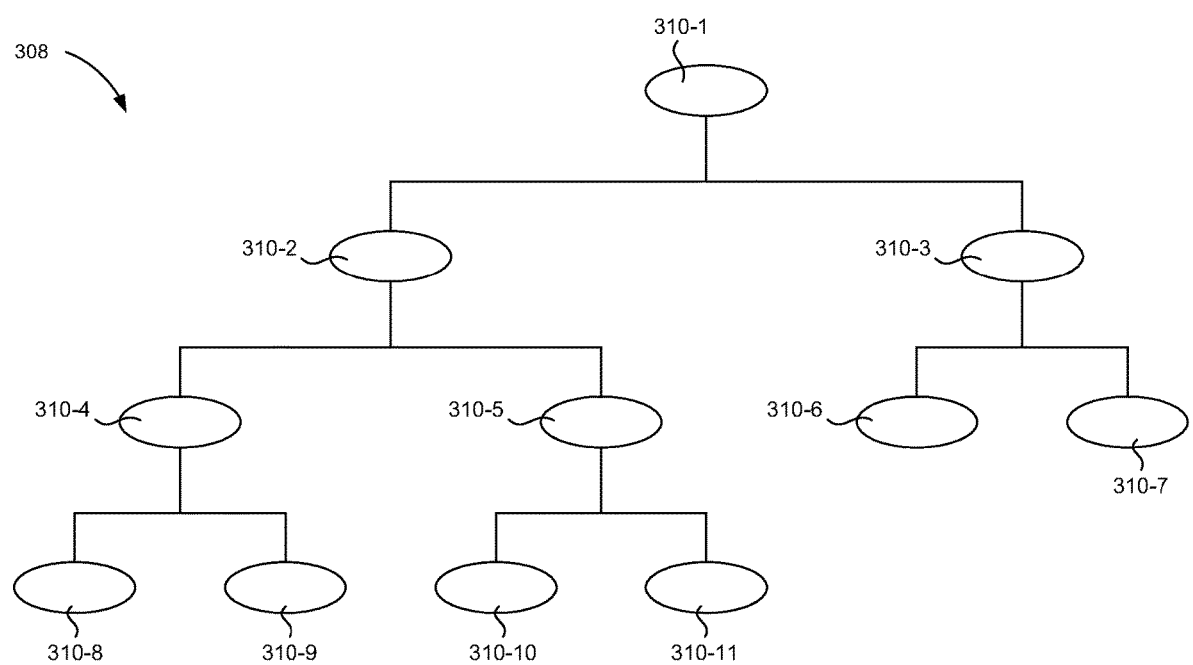
FIG. 3 depicts a virtual agent chat model, according to an example of the principles described herein.

FIG. 3 depicts a virtual agent chat flow (308), according to an example of the principles described herein. That is, as described above a chat flow (308) includes various nodes (310). The different nodes (310) may be context-specific and as depicted in FIG. 3 may be hierarchically organized. That is, a virtual agent may be federated and be used by an organization, or multiple organizations, to respond to various topical requests by various users. For example, a first node (310-1) may relate to "residential banking" and may group together a second node (310-2) named "account detail" and a third node (310-3) named "new account," each of which are similar in that they relate to residential banking but may have different natural language processing parameters. Similarly, within the account detail node (310) there is a fourth node (310-4) named "savings" and a fifth node (310-5) named "checking." Again, these are similar to each other in that they both relate to account detail, and are grouped as such, but have their own respective natural language processing functionality.

Endpoint nodes (310-6, 310-7, 310-8, 310-9, 310-10, 310-11) indicate a most definite level of concreteness and in the specific example provided above are named "brokerage" (310-6), checking (310-7) which both relate to the new account node (310-3) and thus would include natural language processors tailored to form new brokerage accounts and new checking accounts respectively. In another example another endpoint node (310-8) may be named "balance" and another endpoint node (310-9) may be named "transactions." As these are under the "savings" node (310-4), they relate to balance of savings accounts and transactions of a savings account, and thus have respective natural language processing capability. Similarly, other endpoint nodes (310-10, 310-11) also have the name "balance" and "transactions," but as these are under the node (310-5) for checking, they relate to the balance of, and transactions, in a checking account.

Accordingly, as described above, in the event an error is detected, such as providing a savings balance when a checking balance is requested, the system (FIG. 1, 100) may identify this as an error in the routing and may adjust the rules by which conversations are transferred. That is, the system (FIG. 1, 100) in this specific example may update the rules such that the conversation referenced above would not hand the conversation to the savings balance node (310-8) and instead update the rules such that this conversation would be passed to the checking balance node (310-10).

Each node (310) may have its own criteria/parameters for natural language processing or otherwise interpreting human correspondence. Accordingly, as a virtual agent engages with a human user, the conversation may be routed to different nodes (310) based on the different topics brought up in a correspondence. The edges between nodes (310) identify the ability of different nodes (310) to handoff the conversation to another node (310).

A chat model, by comparison, refers to the rules which govern when, and to which node (310), a conversation should be routed. For example, a first node (310) may identify that a particular topic is not related to its area of expertise, but to another node (310) and may hand off the conversation to that node (310) for proper processing. Accordingly, the tree-like structure of the chat flow (308) provides for a tailored grouping of nodes (310) that can be customized to a particular entity or system operating the virtual agent.

Figure 4:
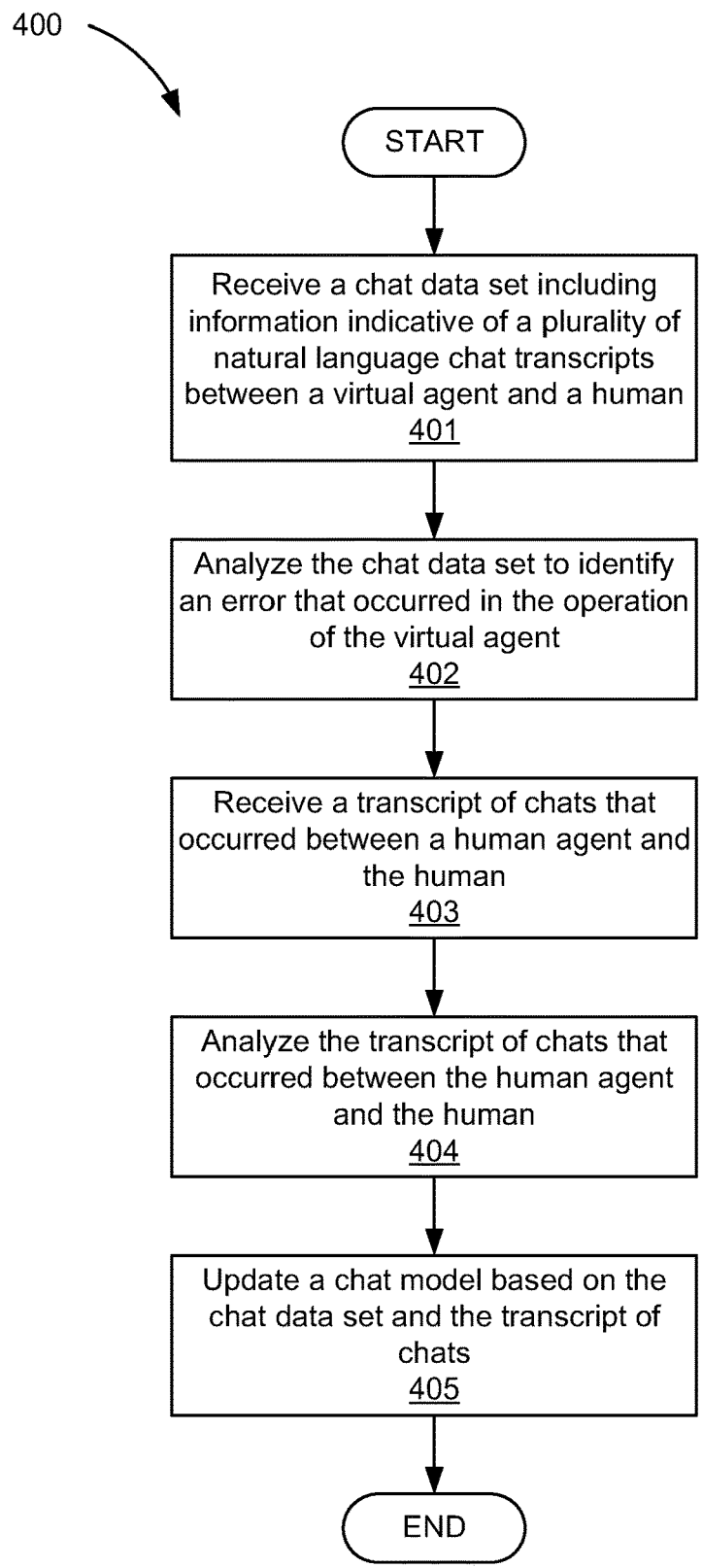
FIG. 4 depicts a flowchart of a method for updating virtual agent chat models, according to another example of the principles described herein.

FIG. 4 depicts a flowchart of a method (400) for updating virtual agent chat models, according to another example of the principles described herein. According to the method (400), a chat data set is received (block 401) and analyzed (block 402) to identify an error that occurred, such as an improper, or ill-timed handing off of the conversation to a different node or human agent. These may be performed as described above in connection with FIG. 2.

In some examples, in addition to updating the chat model based on logs of chats between a virtual agent and a human, the system (FIG. 1, 100) may update the chat model based on transcripts of conversations between a user and a human agent. Accordingly, the system (FIG. 1, 100) receives (block 403) a transcript of chats that occurred between a human agent and the human and analyzes (block 404) the transcript of chats that occurred between the human agent and the human. That is, the virtual agent in general is intended to replicate a human agent. Accordingly, what better training data than the actual actions of a human agent. In some examples, such reception (block 403) and analysis (block 404) is performed during a training stage. That is, the chat model may be generated based on the operations of a human agent. For example, a human agent may be chatting with a human user and recognize a typed statement of "what time does your store open?" as a request for operating hours of the business. Accordingly, the human agent may respond with, "we are open from 8:00 to 5:00." In this example, the system (FIG. 1, 100), specifically the log capture device (FIG. 1, 102), may capture this transcript. The system (FIG. 1, 100) may then store this transcript as training data such that in a subsequent case when the virtual agent receives the same, or a similar request, the virtual agent knows to route the conversation to an operating hours-based node.

As another example, a human agent may be providing information that is not defined in a chat flow and/or chat model. From the logs of the information provided by the human agent, the system (FIG. 1, 100) can create a chat flow and chat model from these logs. That is, it may be the case that a new chat flow and chat model are being developed. As initially, there may not be any nodes, the development of the chat flow/chat model may be entirely based on natural language log analysis of the human agent/human interactions. Such interactions, for example based on keyword analysis, semantic analysis, syntactic analysis, may be used to identify the context/content of the conversation and nodes may be created that relate to these different contexts/contents. The system (FIG. 1, 100) may also identify rules to determine when a conversation should be routed to a particular node, again via natural language processing. Over time as the chat model and chat flow are filled out, the system (FIG. 1, 100) may rely on the human agent/human interactions as before, but also rely on the virtual agent/human interactions. Thus, the system (FIG. 1, 100) at different life stages may rely to different degrees on virtual agent/human interactions and human agent/human interactions to instantiate a chat model/chat flow.

In another example, the receipt (block 403) and analysis (block 404) of transcripts may be during the real-time operation of the virtual agent. That is, as described above, if a virtual agent node (FIG. 3, 310) does not understand a question, or the question becomes to complex, it may be handed to a human agent to address. In this example, the transcript of the human agent/human interaction to understand the question or address the complex question may be used to update (block 405) the chat model. That is, in this case the update (block 405) to the chat model is not only based upon the chat data set but is further based on the transcript of chats that occurred between the human agent and the human. Accordingly, the updated chat model will either be able to understand and interpret human correspondence that it could not previously understand and interpret and, in some cases, may even be able to handle more complex questions before passing off to a human agent. That is, the updates (block 405) in this instance may include removing future routings from being passed to a user such that these conversations may be addressed by the virtual agent nodes (FIG. 3, 310).

As a specific example, a human agent chat may be initiated due to a virtual agent node (FIG. 3, 310) not understanding a request. The human agent may then type, "I see they gave you insurance information instead of banking information." The natural language processor of the log analysis device (FIG. 1, 104) or the human log analysis device could then identify the previous action of providing the insurance information when banking information was requested as an improper routing and update the chat model such that when banking information requests are made, a banking information-based node is triggered to manage the conversation.

Figure 5:
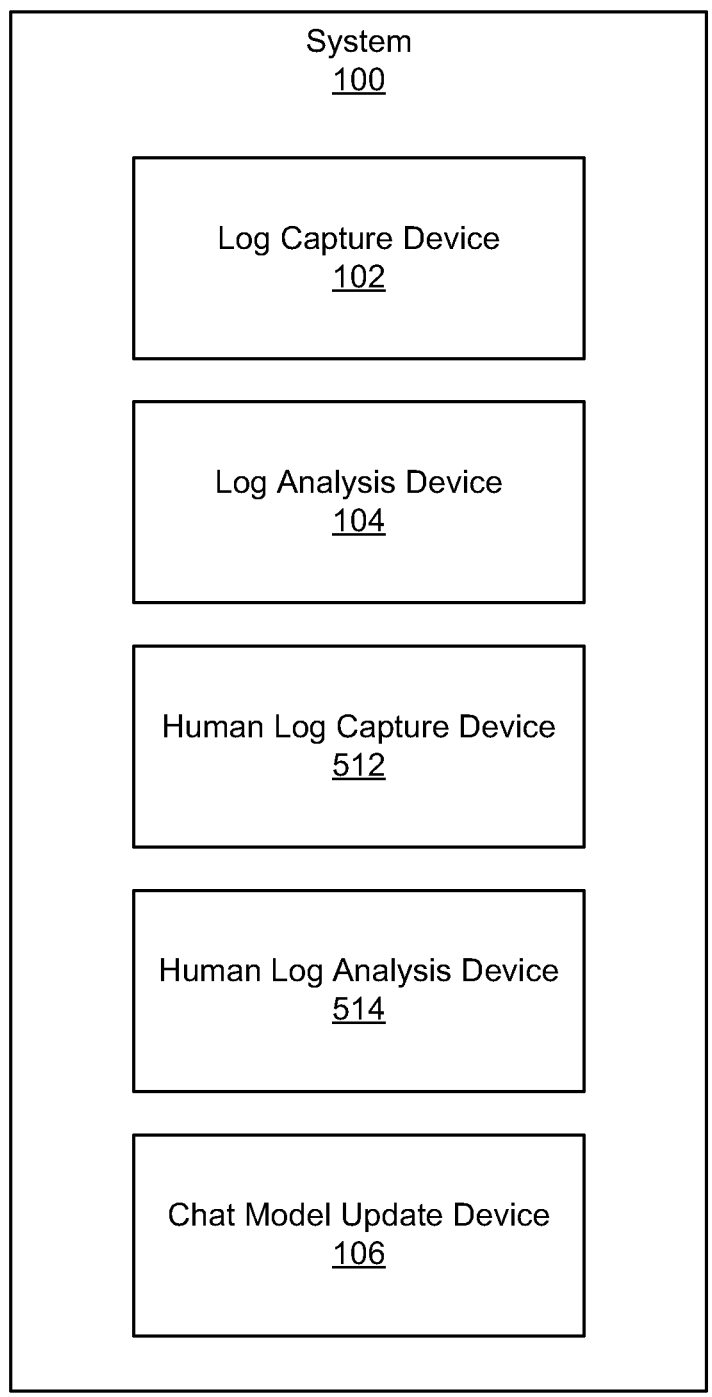
FIG. 5 depicts a system for correcting updating virtual agent chat models, according to another example of principles described herein.

FIG. 5 depicts a system (100) for correcting updating virtual agent chat models, according to another example of principles described herein. The system (100) may include a log capture device (102), a log analysis device (104), and a chat model update device (106) as described above in connection with FIG. 1. In this example, the system (100) includes additional components such as a human log capture device (512). The human log capture device (512) receives a human chat data set including information indicative of a plurality of natural language transcripts of chats that occurred between a human agent and a human. That is, as described above, in addition to the chat model being modified based on virtual agent transcripts, the chat model may be modified based on human agent chats. The human chat data set may include the correspondence between a human agent and a human user. The human chat data set includes this information as well as metadata that is associated with the chat, which metadata may include information such as timestamps on requests by a human user and responses by the human agent as well as operations executed on the human agent's computing device to generate the response and requested information.

The system (100) in this example also includes a human log analysis device (514) to analyze a transcript of chats that occurred between a human agent and the human. As described above, the chat model update device (106) may update the chat model based on the transcripts of chats that occurred between the human agent and the human.

The human log analysis device (514) may include a natural language processor. In general, natural language processing refers to the operation of a device to understand and process human languages. In this example, the information extracted, for example by the natural language processors and/or machine learning devices of the log analysis device (104) and the human log analysis device (514) are passed to the chat model update device (106) to update the chat model as described above.

Figure 6:
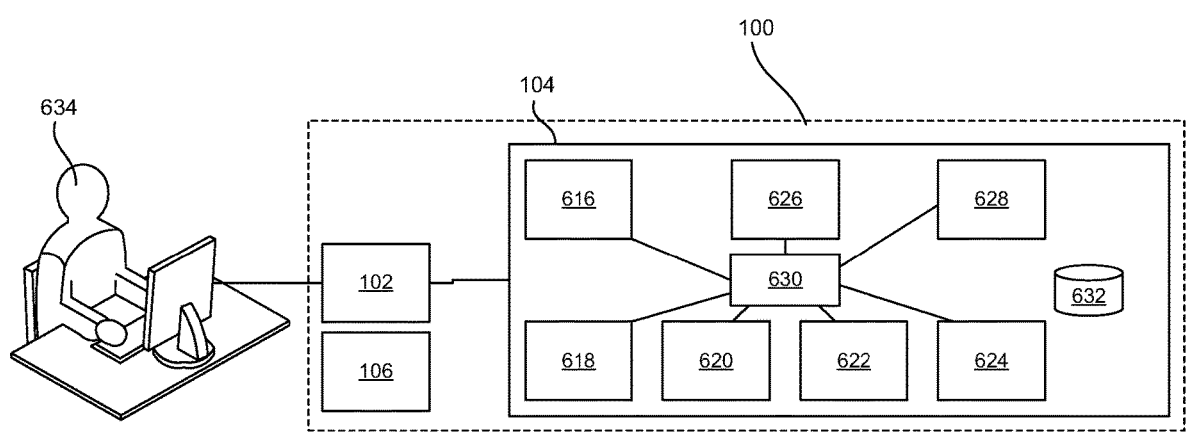
FIG. 6 depicts a system for correcting updating virtual agent chat models, according to another example of principles described herein.

FIG. 6 depicts a system (100) for correcting updating virtual agent chat models, according to another example of principles described herein. As described above, a human user (634) may interact with a virtual agent, which virtual agent includes hardware components and machine logic to carry out the functionality of interacting with the human user (634) and providing relevant feedback/output to the human user (634).

As described above, a log capture device (102) of the system (100) captures the logs across each node (FIG. 3, 310), which logs may be audio-based interactions or chat-based interactions. That is, the log capture device (102) records and stores textual and/or auditory correspondence between the human user (634) and the virtual agent. The system (100) also includes the chat model update device (106) that updates the chat model based on output of the log capture device (102) and the log analysis device (104).

In some examples, the log analysis device (104) includes a database (632) that stores the chat data sets. That is, the database (632) may include the logs themselves, as well as metadata associated with the logs. The database (632) also may store the ground truths, which may be standards based or based on SME inputs. In general, a ground truth is an example representing a specific outcome for a specific situation that can be used as a reference. The database (632) also stores the chat flows (FIG. 3, 308) and the chat models associated with the flows.

The log analysis device (104) also includes a controller (630) which may be referred to as an LBAFE controller and which interfaces with the log capture device (102) and orchestrates the various subcomponents.

A topic manager (616) of the log analysis device classifies and identifies probable topics by using the around truths from the database (632). The topic manager (616) also identifies clusters in upcoming chats for variations in the interaction pattern. A filter (618) of the log analysis device (104) filters irrelevant topics and a topic sequence aligner (620) arranges the sequence of identified topics and identifies roles to handle the topics.

A hierarchy manager (622) of the log analysis device (104) classifies and categorizes the topics as abstract or concrete and an aberration identifier (624) compares the current topics, sequences and categories and identifies aberrations. The chat flow manager (626) creates the chat flow and the chat flow configuration manager (628) manages chat flows for version and other.

Figure 7:
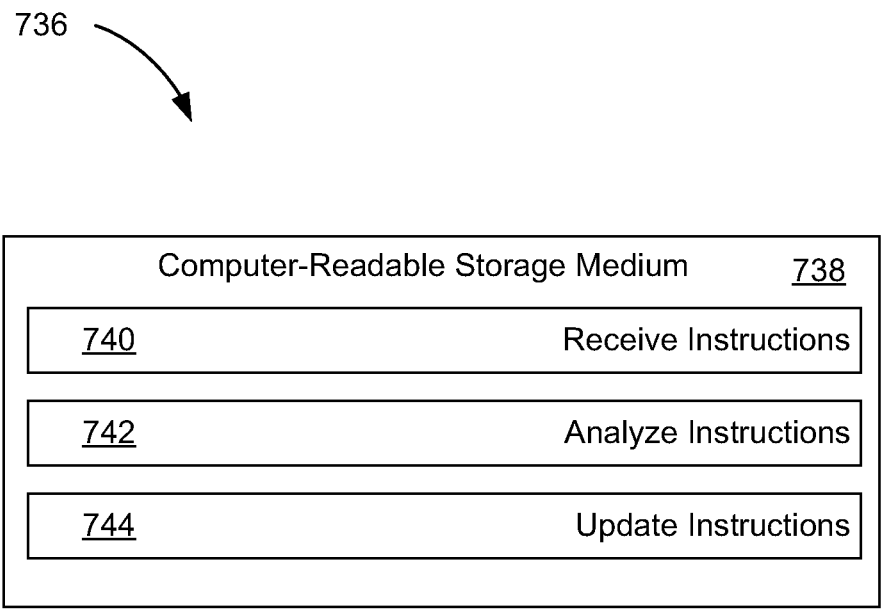
FIG. 7 depicts a computer program product with a computer readable storage medium for updating virtual agent chat models, according to an example of principles described herein.

FIG. 7 depicts a computer program product (736) computer readable storage medium (738) far updating virtual agent chat models, according to an example of principles described herein. To achieve its desired functionality, a computing system includes various hardware components. Specifically, a computing system includes a processor and a computer-readable storage medium (738). The computer-readable storage medium (738) is communicatively coupled to the processor. The computer-readable storage medium (738) includes a number of instructions (740, 742, 744) for performing a designated function. The computer-readable storage medium (738) causes the processor to execute the designated function of the instructions (740, 742, 744).

Referring to FIG. 7, receive instructions (740), when executed by the processor, cause the processor to receive a chat data set including information indicative of a plurality of natural language chat transcripts of chats that occurred between a virtual agent and a human. Analyze instructions (742), when executed by the processor, may cause the processor to analyze the chat data set to identify an error that occurred during operation of the virtual agent. In some examples, the chat data set is added to a training dataset for a natural language processor. Update instructions (744), when executed by the processor, may cause the processor to update a chat model based on the chat data set.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a chat data set including information indicative of a plurality of natural language chat transcripts of chats that occurred between a virtual agent and a human;
determining a topic for a chat;
identifying, by machine logic and based on a determined topic for the chat, to which node in the chat flow the chat should be directed;
analyzing, by machine logic, the chat data set to identify an error that occurred during operation of the virtual agent based on the virtual agent incorrectly routing the chat to a node associated with a topic different from a topic of user input;
associating the error with the node where the error occurred;
identifying, by keyword analysis, that there is no node associated with the topic being discussed; and
updating, by machine logic, a chat model:
based on the chat data set; and
by generating a new node having subject matter expertise for the topic of the chat.

2. The computer-implemented method of claim 1, further comprising receiving a transcript of chats that occurred between a human agent and the human.

3. The computer-implemented method of claim 2, further comprising, analyzing, by machine logic, the transcript of chats that occurred between the human agent and the human.

4. The computer-implemented method of claim 3, wherein updating, by machine logic, the chat model, is further based on the transcript of chats that occurred between the human agent and the human.

5. The computer-implemented method of claim 1, wherein updating, by machine logic, the chat model comprises creating a new chat model.

6. The computer-implemented method of claim 1, wherein updating, by machine logic, the chat model comprises updating an existing chat model.

7. The computer-implemented method of claim 6, wherein updating the existing chat model comprises updating rules of the existing chat model, and wherein the rules indicate which node of the virtual agent a conversation is handed off to.

8. The computer-implemented method of claim 6, wherein updating the existing chat model comprises updating information presented to a user via the virtual agent.

9. The computer-implemented method of claim 1, wherein identifying an error that occurred in the operation of the virtual agent is based on user input.

10. The computer-implemented method of claim 1, further comprising flagging portions of the chat transcript to identify user dissatisfaction with an operation of the virtual agent and why the operation of the virtual agent was unsatisfactory.

11. A system, comprising:
a log capture device to receive a chat data set including information indicative of a plurality of natural language chat transcripts of chats that occurred between a virtual agent and a human, wherein:
a virtual agent chat flow comprises a hierarchically organized arrangement of nodes; and different nodes have different subject matter expertise and different natural language processing parameters and relate to different topics brought up in the chat;
a log analysis device to analyze the chat data set to:
identify when a human agent is introduced into the chat;
identify, as an error that occurred during operation of the virtual agent, when the virtual agent prematurely hands the chat off to the human agent;
associate the error with a node where the error occurred; and
identify, by keyword analysis, that there is no node associated with a topic being discussed; and
a chat model update device to update a chat model:
based on the chat data set by providing new keywords to indicate when a chat is to be passed to a different node; and
by generating a new node having subject matter expertise for the topic of the chat.

12. The system of claim 11, wherein the log analysis device identifies when the virtual agent hands a conversation to an incorrect node of the virtual agent.

13. The system of claim 11, wherein the log analysis device identifies when the virtual agent did not understand a conversation entry.

14. The system of claim 11, wherein:
the log analysis device identifies variations in human correspondence requesting same information; and
the chat model update device updates the chat model based on an identified variation.

15. The system of claim 11, further comprising a topic identifier to identify a topic of the chat data set.

16. The system of claim 15:
further comprising a human log analysis device to analyze a transcript of chats that occurred between a human agent and the human; and
wherein the chat model update device updates the chat model based upon the transcript of chats that occurred between the human agent and the human.

17. The system of claim 11, wherein the chat model update device updates rules that identify to which node of the virtual agent a conversation is handed.

18. The system of claim 11, wherein the chat model update device adds nodes to a chat flow.

19. A computer program product for managing a virtual agent, the computer program product comprising a non-transitory computer readable storage medium having program instructions embodied therewith, the program instructions executable by a processor, to cause the processor to:
receive, by the processor, a chat data set including information indicative of a plurality of natural language chat transcripts of chats that occurred between a virtual agent and a human;
identify, by the processor, which nodes of the virtual agent are triggered in a chat and when triggered nodes of the virtual agent are triggered, wherein different nodes of the virtual agent have different subject matter expertise and different natural language processing parameters and relate to different topics brought up in the chat;
identify when a human agent is introduced into the chat to respond to a request;
analyze a transcript of the human agent responding to the request;
determine that a response by the virtual agent is unrelated to a topic of the chat; analyze, by the processor, the chat data set to identify an error that occurred during operation of the virtual agent based on:
the virtual agent incorrectly routing the chat to a node associated with a topic different from a topic of user input; and
the transcript of the human agent responding to the request;
identify, by the processor, the node in the virtual agent from which the error originates;
identify, by the processor, a human resolution of the error that occurred during operation of the virtual agent;
identify, by keyword analysis, that there is no node associated with the topic being discussed; and
automatically update, by the processor, a chat model based on the human resolution of the error by:
updating rules which identify to which node of the virtual agent the chat is to be handed;
providing new keywords to indicate when a chat is to be passed to a different node; and
creating a new node in an existing chat model wherein the new node has subject matter expertise for the topic of the chat.

20. The computer program product of claim 19, wherein the chat data set is added to a training dataset for a natural language processor.

* * * * *